Figure 2:
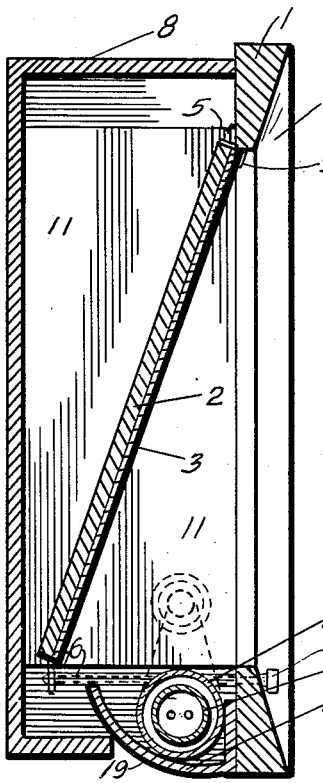

Nov. 5, 1940.                J. H. MILLER                 2,220,262
                        ILLUMINATED PICTURE FRAME
                          Filed June 3, 1939

Inventor
JOHN HENRY MILLER.
By Howard J. Whelan.
                Attorney

Patented Nov. 5, 1940

2,220,262

UNITED STATES PATENT OFFICE 2,220,262

ILLUMINATED PICTURE FRAME

John Henry Miller, Baltimore, Md.

Application June 3, 1939, Serial No. 277,226

5 Claims. (Cl. 240—4)

This invention refers to pictures and illuminated objects and more particularly to devices for lighting pictures. The invention has for its objects: to provide a system of artificial lighting that will prevent glare from the picture backgrounds, especially oil paintings, reaching the eyes of the general observer; to provide for a variation of the view by changing and varying the coloring of the lighting and thereby give it the appearance of activity, variation in shadows, and other natural effects, that attract the eye and excite the interest of the observer. Another object is to give the effect of depth to the picture, and to make a frame for the picture that will adapt itself to the conditions without its actual construction being apparent to the superficial glance. A further object is to make the device adjustable to suit the conditions under which it is to be used, and to provide for any desirable ventilation that may be needed to overcome the effect of heat and radiation, from the lighting elements.

Other objects will become apparent as the invention is more fully set forth.

Oil paintings are particularly hard to enjoyably appreciate as ordinarily hung on a wall, and the use of conventional artificial illumination does not produce the satisfactory results desirable. The reflected lights from the picture flat on the wall, to the eyes of the observer, frequently produce an annoying effect, and various blank and uncertain areas in the picture.

The observer tries to adjust himself to the picture but finds that he cannot do so satisfactorily. In the end, the picture creates such fatigue to the eyes that the observer tires of looking at it, and quickly gives up the task of viewing it. Exterior illumination is tried at times, but even in such instances, does not meet all requirements. It does, however, require the use of conspicuous reflectors and supports that fill the room with fixtures. In this invention, the oil painting is mounted in an angular position in a special picture frame structure that has its back cabinet set in the wall, with a tubular light reflecting upwardly over the area of the picture and away from the line of sight of the observer. In addition, the tubular light is colored with several distinct colors, that vary the color illumination and produce the effects of blending and shadows over the picture, as the light is rotated or the colors themselves are operated in the field of lighting rays passing to the parts of the picture. The heat from the lights produces air currents that assist in giving the effect of movement to the scene in the picture and that vitality which is unobtainable in other ways.

Figure 1:
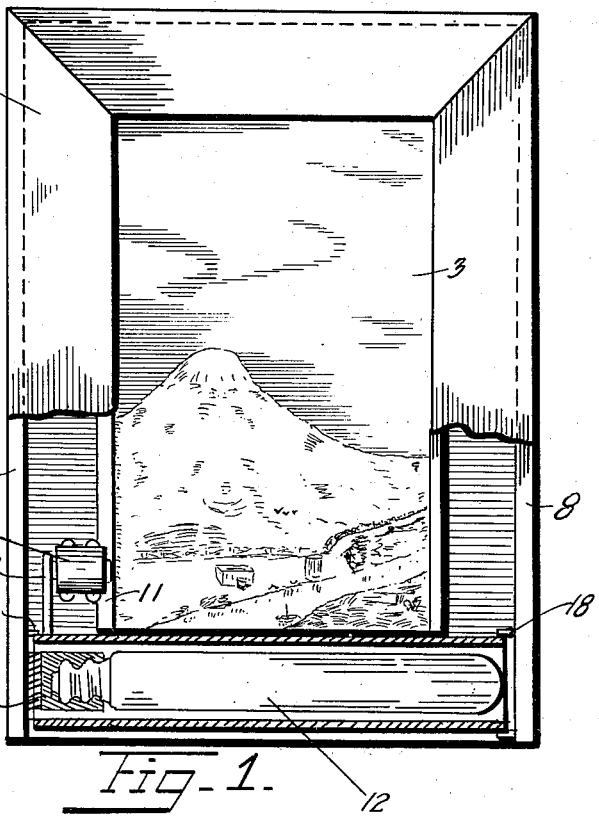
Figure 3:
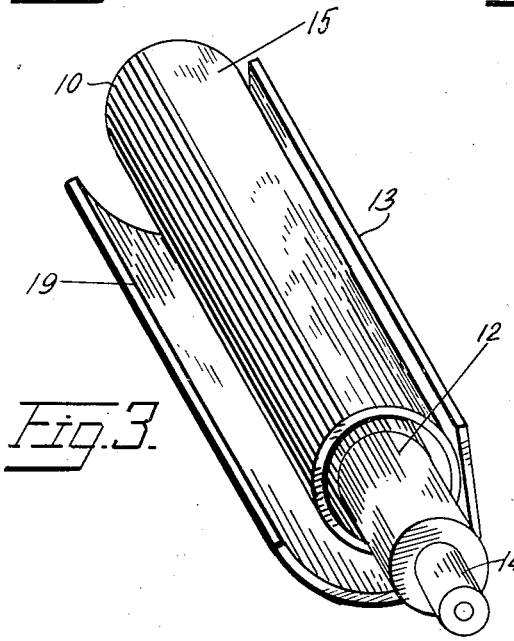

In the drawing which gives an example of this invention:

Figure 1 is a front elevational view partly broken away and in section of a picture frame cabinet embodying this invention, Figure 2 is a general sectional side view of Figure 1, Figure 3 is a detail in perspective of the light elements and mechanism used in this frame for controlling and modulating the lighting effects.

Similar reference characters refer to similar parts throughout the drawing.

In the drawing, the construction 1 represents a conventional frame with the face thereof preferably bevelled inwardly at an angle of about that indicated. The frame has a back member 2 connected to it and arranged to take a painting 3. The back 2 is preferably hinged at 5 to permit it to be adjusted to various angles and this adjustment is affected by the use of a special rod mechanism 6 having a handle or button 7 on the frame face placed inconspicuously and without detracting from the general appearance of the frame. The frame is provided with a cabinet structure 8 open in front and adapted for insertion in the wall, while the frame itself surrounds the hole in same and keeps the appearance attractive and flush. The structure 8 is preferably rectangular and sufficiently deep to permit the picture to be adjusted to a long range of angular positions. The picture itself is surrounded on all sides with a band 9 of suitable material which covers up the edges and keeps the picture in place. At the sides of the picture and back member 2, side pieces 11 of flat material are provided to restrict the view beyond the picture. These side pieces are colored to suit and to make them relatively inconspicuous. They are tilted at a slight angle or slightly curved to make the reflection of light reflect back of the picture and thus bring out shadows on the raised portion of the picture and thereby accentuate its pictorial features. It also definitely directs the beams of light away from the observer and thus will keep the effects of glare from him.

The artificial illumination for the picture is produced through the use of a tubular electric lamp 12, extending horizontally across a trough 13 at the bottom of the picture.

Suitable wiring connections and socket 14 are provided to hold the lamp 12 and connect it to the electric service. A shell 15 having colored films 10 formed thereon in sections, and surrounding the lamp 12, gives a system of projected color schemes and tints for varying the illuminating effects on the picture by exterior projection. The shell is cylindrical in form and rotatable in the trough, and may be operated by a motor 16, suitably mounted in the cabinet, and operatively attached with a belt 17 to the shell. Suitable supports or journals 18 permit the color cylinder to operate. The trough 13 consists of a reflector 19 attached to the rear of the frame and formed in a curve adapted to direct the light beams from the lamp to the picture outline. The curve is like that of a parabola and reflects the light beams or rays over a spreading area and thereby makes the distribution uniform.

The angular position of the picture enables it to guide the heated air waves from the picture as they rise from the lamp, as well as provide for an air pocket in its rear to dissipate the heat at the back of the picture and back that supports it.

When the picture and frame-cabinet is installed, its picture is set at an angle that will suit the observers below, and then secured in that position. The light is turned on and the motor operated color cylinder started. The light illuminates the picture first without any color in the light, and then as the cylinder revolves, the color films are brought into the line of illumination and gradually transfer the coloring on the picture to the effects produced by each color. The colored light is spread across the picture from one edge to the other, and in doing so, seems to reproduce the effects of wind, or the sun passing in front of a cloud and other natural effects. This enlivens the picture and gives the observer the idea or impression that it is activated and out of the realm of "still" representation. The effect is enjoyable and gives the eyes of the looker-on a restful activity, as well as increase his mental reactions and interest in the portrayal. If the scene is that of fields, trees, and scenic background, the impression is that of wind, sun, moon and general natural movements in its represented environment. If the picture is the portrait of a person, the color movement seems to produce vitality in the person's features and clothes; and being without glare although evenly illuminated, the picture seems to be that of a live person encompassed in a frame.

The use of such pictures in a restaurant, banquet hall, and the like, affords the persons sitting at the tables, the unusual pleasure of seeing activated pictures, instead of the dull outlines half obliterated by stray reflections, intermingled in the ordinary work of art. This change to activity accompanied by the bringing out of the main characteristics in the pictures through the illumination described, at the bottom and sides, makes everything clear and distinct. The adjustment of the angular positions of the picture, acts in a quasi-focussing manner to the eyes of the observer, as well as to control the reflecting reactions. In general the picture frame is designed to meet any condition or situation apt to arise in the placing of pictures in a position to be fully examined and used.

While but one form of the invention is shown in the drawing, it is not desired to limit this application for patent, otherwise than limited by the prior art, as it is understood that other constructions could be developed that would use the same principles and come within the scope of the appended claims.

Having thus described the invention, what is claimed is:

1. A picture frame cabinet of the class described comprising in combination, a frame for the front of the cabinet, a rectangular box mounted at the back of the frame, a trough and reflector at the bottom of the box, a tubular lamp in the trough, a rotatable shell over the lamp with color tints translucently provided thereon, a hinged back for supporting pictures mounted at the back of the frame adapted for adjustable and angular disposition with respect to the lamp and the frame, means for adjusting the back from the face of the frame, and side partitions mounted at the edges of the back for restricting the view of the box beyond the edges of the back.

2. A picture cabinet of the class described comprising in combination, a frame for the front of the cabinet, a box mounted at the back of the frame, a trough and reflector, a lamp in the trough, a rotatable shell over the lamp with color tints translucently provided thereon, a hinged back for supporting pictures mounted at the back of the frame adapted for angular disposition with respect to the lamp and frame.

3. A picture cabinet, comprising in combination, a rectangular box adapted for positioning in a wall, a picture frame of conventional form for mounting on the front of the box and setting flush on the wall, a tubular lamp supported in the box, a hinged back for supporting a picture for the frame, and adapted to be variably positioned with regard to the said lamp to direct the rays from the eyes of the normal observer, means for restricting the view beyond the sides of the picture and back, a reflector for spreading light from the lamp across the picture surface.

4. In a picture frame structure, an angularly adjustable back for the picture, a light for illuminating the picture front out of the normal line of sight of the observer, and an interior reflector for directing the rays of light across the picture on said back, means for adjusting the back from the exterior of the frame, a compartment in rear of the frame for enclosing same, and side pieces angularly disposed for restricting the view beyond the sides of the picture and for reflecting light to the picture.

5. In a picture frame structure, an angularly adjustable back for the picture, a light for illuminating the picture front out of the normal line of sight of the observer, and an interior reflector for directing the rays of light across the picture on said back, means for adjusting the back from the exterior of the frame, a compartment in rear of the frame for enclosing same, and side pieces angularly disposed for restricting the view beyond the sides of the picture and for reflecting light to the picture, and a rotating cylinder of color tints for coloring the rays from the light and producing varying lighting effects on the picture.

JOHN HENRY MILLER.